United States Patent [19]
Garvey et al.

[11] 4,191,399
[45] Mar. 4, 1980

[54] VEHICLE OCCUPANT RESTRAINT SYSTEM

[75] Inventors: Louis P. Garvey, Birmingham; Chester F. Rhamstine, Mt. Clemens, both of Mich.

[73] Assignee: General Motors Corporation, Detroit, Mich.

[21] Appl. No.: 907,116

[22] Filed: May 18, 1978

[51] Int. Cl.² ............................................. B60R 21/10
[52] U.S. Cl. .................... 280/806; 180/282; 280/753; 296/65 A
[58] Field of Search .............. 280/747, 744, 753; 180/112; 296/65 A, 65 R; 297/216, 379, 384, 385, 389, 417; 248/118

[56] References Cited
U.S. PATENT DOCUMENTS

| | | | |
|---|---|---|---|
| 2,365,626 | 12/1944 | Carlisle | 280/747 |
| 2,760,813 | 8/1956 | Colm | 296/65 A |
| 2,872,241 | 2/1959 | Shelden | 296/65 A |
| 3,471,197 | 10/1969 | Ely | 280/747 |
| 3,488,090 | 1/1970 | Douglas | 280/747 |
| 3,524,677 | 8/1970 | Louton | 297/216 |
| 3,897,101 | 7/1975 | Hess | 296/65 A |
| 4,061,365 | 12/1977 | Nagano et al. | 280/747 |
| 4,118,067 | 10/1978 | Tanaka | 297/216 |

Primary Examiner—David M. Mitchell
Attorney, Agent, or Firm—Charles R. White

[57] ABSTRACT

The shoulder belt retractor is secured to an upper outboard portion of a seat back frame. Under predetermined vehicle deceleration conditions, the seat back is restrained from forward movement by blocking mechanism mounted on the side door so that the seat back and retractor are held stationary and the occupant using the shoulder belt is effectively restrained.

5 Claims, 6 Drawing Figures

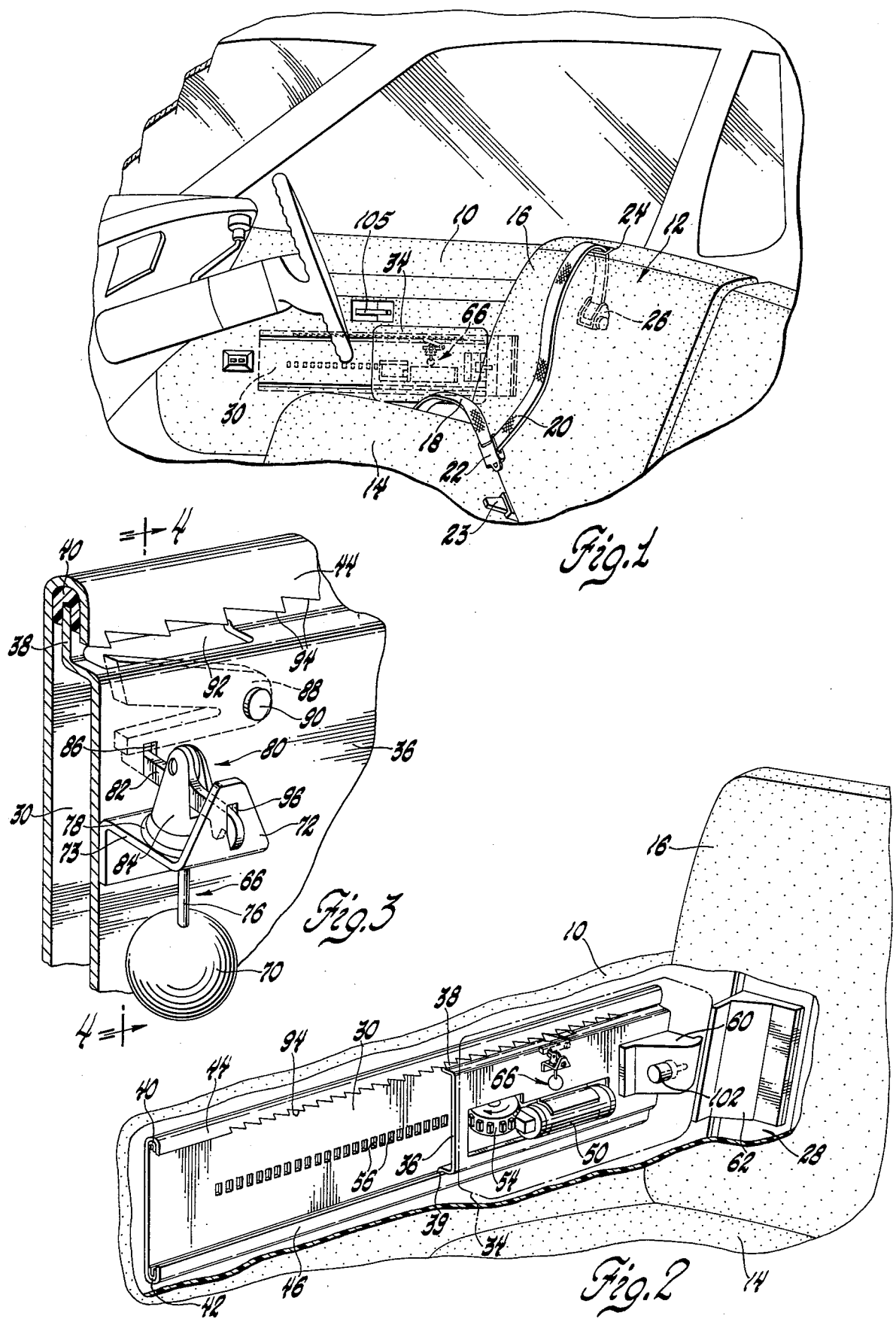

VEHICLE OCCUPANT RESTRAINT SYSTEM

This invention relates to a new and improved vehicle occupant restraint system in which a seat back is restrained from forward movement by a blocking mechanism mounted on the vehicle door so that the seat back can function as an anchor for a restraint belt which holds a user in the seat under predetermined vehicle deceleration conditions.

Prior to the present invention, various seat belt arrangements have been utilized in vehicles which allow a user to conveniently and comfortably ride in or operate the vehicle under normal conditions and to hold the occupant in his seat under severe load conditions such as may occur on vehicle impact. While many of the prior systems have provided important benefits in passenger and operator protection, they involve complex lap and shoulder belt systems. Often the shoulder belt extends over a seat back and into an anchorage secured directly to the vehicle body. Such belting may interfere with entrance to the rear seat and with the foot and leg room of rear seat occupant.

To remedy this, proposals have been made to anchor the seat belt directly to the seat back but heretofore such construction has been considered undesirable because of the increased strength and reinforced seat structures needed to withstand potential loads. Generally, this would necessitate larger and heavier seat and anchor components which undesirably increase the vehicle weight. With this invention, however, the need for such stronger seat structures is eliminated by the new and improved mechanism coupling the seat back with side door construction on vehicle impact. With the seat belt retractor mounted directly on the outboard portion of the seat back and with the seat back in turn blocked from forward movement with respect to the side door, seat belt loads will be transmitted to the door structure which are sufficiently strong to withstand increased loadings in the event of a vehicle impact. Preferably the blocking mechanism is incorporated on a linearly adjustable arm rest on the door which prevents forward movement of the seat back under impact conditions but normally does not interfere with the opening and closing of such door.

It is a feature, object and advantage of this invention to provide a new and improved vehicle occupant restraint belt system in which a shoulder belt is anchored to the outboard portion of an associated seat back which under predetermined load is anchored to or blocked from forward movement with respect to the vehicle side door so that high loads generated during vehicle impact will be withstood by the seat belt, the seat back and the side door.

Another feature, object and advantage of this invention is to provide a new and improved seat belt system for occupants of a vehicle in which the seat back is under predetermined loads blocked from forward movement by the side door by a new and improved blocking mechanism interconnecting these two components so that the upper outboard portion of the seat back may be effectively utilized as a direct attachment point for the anchorage of a belt used to restrain inadvertent movement of occupant using the system during predetermined vehicle deceleration conditions.

Another feature, object and advantage of this invention is to provide a new and improved seat belt system for occupants of a vehicle in which the seat back is blocked out by the arm rest attached to a side door by a pendulum-actuated locking mechanism to permit the upper outboard portion of the seat back to be effectively used as an attachment point for a shoulder belt of a restraint system which prevents inadvertent movements of an occupant relative to the seat on vehicle impact.

Another feature, object and advantage of this invention is to provide a new and improved blocking device between the front seat back of a vehicle and the side door thereof so as to maintain the seat back in position and resist loads applied to the rear of the seat back in the event of predetermined vehicle deceleration conditions.

These and other features, objects and advantages of this invention will become more apparent from the following detailed description and drawings in which:

FIG. 1 is a perspective view of a portion of the interior of a vehicle;

FIG. 2 is an enlarged perspective view of a portion of FIG. 1 showing blocking of the seat back by the arm rest of the vehicle door;

FIG. 3 is an enlarged perspective of a portion of FIG. 2;

Figure 4:
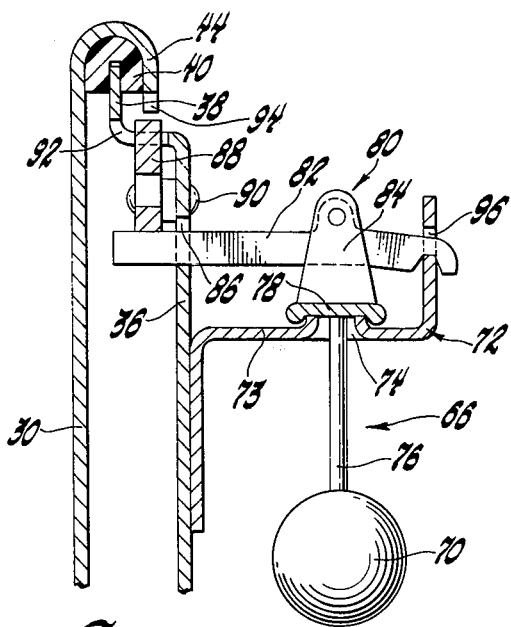
FIG. 4 is a view taken along lines 4—4 of FIG. 3.

Turning now in greater detail to the drawing, there is shown in FIG. 1 a portion of a vehicle body having side door 10 conventionally hinged for movement between open and closed positions. Within this body there is a front occupant seat 12 preferably adjustable by a motor powered seat actuator such as disclosed in U.S. Pat. No. 3,188,044 issued June 8, 1965 to Epple or alternatively by a mechanical seat adjuster such as disclosed in U.S. Pat. No. 3,853,373 issued Dec. 10, 1974 to Corbett. The seat 12 comprises a forwardly extending seat cushion assembly 14 in addition to a seat back assembly 16 inclined upwardly from the seat cushion assembly. Preferably the seat back assembly 16 is pivotally mounted with respect to the seat cushion assembly as disclosed in the above referenced Corbett patent so that it may be tilted to an easy enter position which provides ease of ingress and egress with respect to a rear seat, not illustrated. Alternatively, the seat could be a one-piece bench seat.

Operatively disposed in the vehicle body is a belt restraint system for an occupant of seat 12 comprising a lap belt 18 adapted to fit across the pelvic area of the occupant and a shoulder belt 20 which is adapted to extend diagonally across the occupant's torso. The lap belt is connected at its outboard end by a conventional inertia locking retractor fastened to the vehicle floor or to other suitable anchorage while the inboard end terminates at latch plate 22. The latch plate is adapted to be manually inserted and locked into buckle 23 by the user which in turn is secured by conventional belting and an anchor plate to the vehicle floor. The shoulder belt 20 is secured to the latch plate 22 and routes from the latch plate upwardly and diagonally across the seat back and then downwardly through a structurally sound belt guide 24 provided in the top of the seat back 16. From the belt guide 24 the shoulder belt connects to a shoulder belt inertia locking retractor 26, mounted internally of the seat back and secured to seat frame side bar 28.

Under predetermined load conditions, this invention provides the blocking of the seat back 16 with respect to the side door 10 to prevent collision induced forward movement of the seat back so that retractor 26 anchors the upper end of the shoulder belt 20. Under these conditions, guide 24 and belt 20 are operable to securely hold the user/occupant in a seated position. As best shown in FIG. 2, the inner panel of door 10 has a longitudinally extending channelled track 30 secured thereto on which an arm rest assembly 34 is guided for fore and aft sliding movement. The arm rest assembly 34 includes an internal slide 36 guided in the track. The slide 36 is formed with upper and lower outwardly projecting edges 38 and 39 which slidably fit into longitudinally extending grooves of the upper and lower guide 40 and 42 of the track. As shown, these guides are secured in position by the inwardly turned upper and lower edges 44 and 46 of the track. The slide 36 is moved to predetermined position along the track 30 by a reversible electric motor 50 secured to the slide 36. The motor 50 rotatably drives a cog 54 whose teeth are adapted to engage the series of perforations 56 formed in a linear path in the central web of the track 30. By operating the drive motor in a first direction, the cog is rotated clockwise as illustrated by the arrow to move the slide forwardly of the illustrated position to allow free opening or closing of the door without interference between the arm rest and seat back. The motor is operated in an opposite direction when the door is closed so that cog rotation is reversed and the slide is linearly driven in a reverse direction. As shown, slide 36 has a blocking device 60 secured thereto which is adapted to move into and out of blocking engagement with seat back blocking device 62 fastened to seat belt frame 28. The blocking devices 60 and 62 are respectively located within the confines of the arm rest and seat back but normally are not engaged providing clearance so that the associated door can be opened and closed without interference. Under predetermined load the seat back will move forwardly relative to the arm rest until the blocking devices 60 and 62 engage and prevent relative forward movement. If desired, the flanges on the blocking devices could overlap under such condition so that the door is locked until the load is removed. A pressure sensor described below still stop the arm rest in a rearward position when the arm rest touches the seat back.

Furthermore, a special pendulum lock assembly 66 is actuable in response to vehicle impact to lock the slide 36 to the track 30 and thereby to the door panel so that under predetermined impact conditions the seat back is structurally interconnected with the door. Under such conditions, the seat back cannot move forwardly relative to the door and the shoulder belt retractor reel 26 and guide 24 are fixed in position so that the upper end of the shoulder belt is securely anchored.

Figure 5:
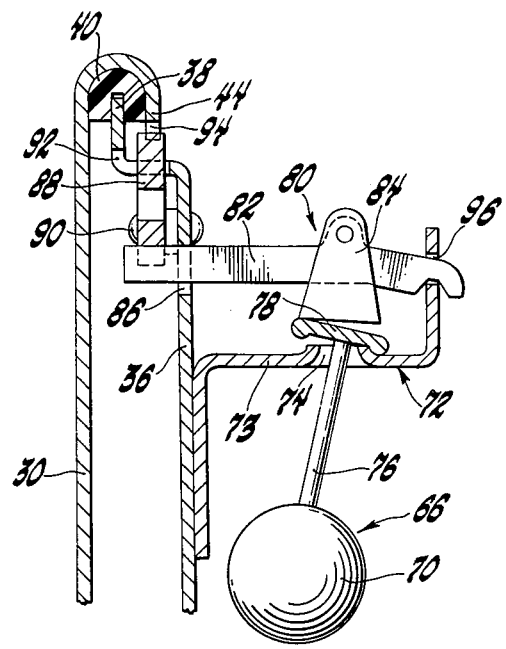
FIG. 5 is a view similar to FIG. 4 illustrating operation of a portion of this invention.

More specifically, the pendulum lock assembly incorporates a pendulum bob 70 mounted for swinging movement on a bracket 72 secured to and projecting inwardly from slide 36. The bracket 72 is formed with a laterally extending center section 73 having an annular opening 74 through which pendulum rod 76 projects. A rockable annular support cap 78 is secured to the upper end of rod 76 above opening 74 that permits the pendulum to swing in any direction from the vertical as illustrated in FIGS. 4 and 5. Disposed above cap 78 is an actuator assembly 80 incorporating a laterally extending lever 82 centrally pivoted to a conical lever support 84 which sits on top of cap 78. The outboard end of lever 82 projects through an elongated slot 86 in the slide 36 and under an arm of a locking pawl 88 mounted by pivot 90 to the slide 36 for upward pivotal movement through access opening 92 in the slide and into locking engagement with the downwardly projecting teeth 94 formed in the upper edge 44 of the track 30. The lever 82 has an inboard end that projects through an opening 96 in the outer end of bracket 72. When the pendulum swings on impact, the cap 78 tilts to move the lever support 84 upwardly so that the inboard end of the lever 82 grounds on the outer end of the bracket 72 and the outboard end actuates locking pawl 88 which swings upwardly into locking engagement with the teeth 94 on the track. With the locking pawl engaged with the track teeth, relative forward movement of the side door and seat back is prevented. It will be appreciated that under normal conditions the pendulum is disposed in the FIG. 3 position in which the locking pawl is out of engagement with the track teeth.

Figure 6:
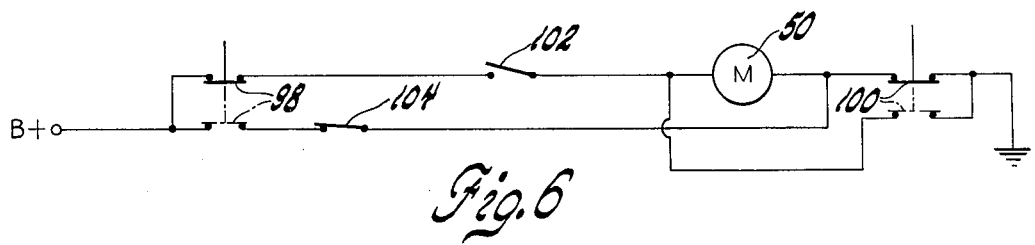
FIG. 6 is a diagram of control circuitry for this invention.

FIG. 6 discloses a suitable circuit which may be employed with the drive motor 50 to control the seat back blocking arrangement described above. This circuit which is energized by a battery voltage B+ incorporates the motor 50, a pair of door position switches 98 and 100 shown in a door closed position and a pair of pressure sensitive limit switches 102 and 104. Limit switch 102 is mounted on the seat back 16 and opens when the arm rest is against the seat back and exerts a predetermined pressure on this switch. Limit switch 104 is secured to the door panel and opens with the arm rest in the full forward position. With this circuit the polarity across the motor is reversed as a function of door position. Assuming that the arm rest is in the full rearward position against the seat back and in a blocking position and it is desired to open the door, the door latch handle 105, is manually actuated for opening the door. On actuation of the door handle, the switches 98 and 100 will be displaced to the door open position shown in dotted lines. With the pressure sensitive switch 104 closed, the motor 50 is energized to drive the slide and arm rest forwardly until it reaches a terminal position in which the limit switch 104 opens to break the circuit. When the door is closed, the switches 98 and 100 are moved to the door locked position. Pressure limit switch 102 is closed so that the polarity across the motor is reversed to drive the arm rest rearwardly to the seat back blocked position shown in FIG. 2 at which point the limit switch 102 again opens.

The seats are preferably power adjustable and the seat adjuster motor can overcome a clutch, not shown, in the arm rest motor to allow the arm rest to travel forward with the seat. If desired, seat adjustment can be made with the door open. After the door is closed, the arm rest will travel back until it contacts the seat back. At this time, a pressure is built up between the arm rest and seat back which shuts off the drive motor. If this pressure should change, for any reason, such as adjusting the seat rearward, the motor will drive the arm rest back until the required pressure is again achieved. This ensures a minimum clearance between the arm rest and seat frame blocking structures.

While a preferred embodiment of this invention has been shown and described to illustrate the invention other embodiments will be apparent to those skilled in the art. This invention is not limited to the particular illustrated invention but only by the following claims.

We claim:

1. In a vehicle having a body with a side door pivotally movable between open and closed positions to facilitate entry and exit of a vehicle occupant, a seat for a vehicle occupant operatively mounted within said body adjacent to said door, said seat having a bench and a back disposed laterally of said door, a restraint belt for an occupant sitting in said seat, first anchor means operatively connected to one end of said belt and secured to said seat back, second anchor means operatively connected to said vehicle body disposed laterally from said door, said second anchor means including selectively engageable buckle means for connection with the other end of said belt, and interlock means for securing said seat back directly to said side door to lock said door under predetermined forward load on said seat back and prevent forward movement of said seat back relative to said door and thereby holding said first anchor means stationary relative to said vehicle body.

2. In a vehicle having a body with a side door pivotally movable between open and closed positions to facilitate entry and exit of a vehicle occupant, an occupant seat operatively mounted within said body adjacent to said door, said seat having a horizontal bench and a back extending upwardly from said bench and laterally of said door, a restraining belt for an occupant sitting in said seat, first anchor means operatively connected to one end of said belt and secured to an upper portion of said seat back adjacent to said door, second anchor means operatively connected to said vehicle body disposed laterally from said door, said second anchor means having selectively engageable buckle means for interconnecting the other end of said belt with said second anchor means so that belt can be fitted across the torso of said occupant, and interlock means between said seat back and said side door to lock said door under predetermined forward load on said seat back and prevent forward movement of said seat back relative to said door and thereby holding said first anchor means stationary relative to said vehicle body.

3. In a vehicle having a body with a side door pivotally movable between open and closed positions to facilitate entry and exit of a vehicle occupant, an occupant seat operatively mounted within said body adjacent to said door, said seat having a horizontal bench portion and an upwardly extending back disposed laterally of said door, a restraint belt for an occupant sitting in said seat, first anchor means operatively connected to one end of said belt and secured to an upper outboard portion of said seat back adjacent to said door, second anchor means operatively connected to said vehicle body disposed laterally from said door selectively engageable buckle means for interconnecting the other end of said belt with said second anchor means so that belt can be fitted across the torso of said occupant, cooperating blocking means on said side door and said seat back selectively engageable to prevent forward movement of said seat back relative to said door to thereby hold said first anchor means and an occupant using said restraint belt stationary relative to said vehicle body and cooperating track and slide means supported by said side door to support said blocking means of said side door and pendulum means supported by said slide means for locking said slide means to said track in response to predetermined conditions of vehicle deceleration.

4. In a motor vehicle body having an occupant seat mounted for fore and aft adjusting movement and positioned adjacent a door movable between open and closed positions, and an occupant restraint belt anchorage on the seat, the combination comprising:
track means on the door extending longitudinally thereof;
carriage means mounted on the track means for movement longitudinally thereof;
drive means acting between the carriage means and the track means for moving the carriage means longitudinally thereof;
control means responsive to opening movement of the door for moving the carriage means forwardly and responsive to closing movement of the door for moving the carriage means rearwardly into engagement with the seat generally adjacent the restraint belt anchorage;
and vehicle inertia responsive locking means for locking the carriage means to the track means at its rearwardmost position to block the occupant seat against forward movement by restraint belt loads transferred thereof.

5. In a motor vehicle body having an occupant seat mounted for fore and aft adjusting movement and positioned adjacent a door movable between open and closed positions, and an occupant restraint belt anchorage on the seat, the combination comprising:
track means on the door extending longitudinally thereof,
carriage means mounted on the track means for movement longitudinally thereof;
drive means acting between the carriage means and the track means for moving the carriage means longitudinally thereof;
interlock means operatively connecting said seat and said door when said carriage means is moved to a rearward position adjacent to said seat;
control means responsive to opening movement of the door for moving the carriage means forwardly and responsive to closing movement of the door for moving the carriage means rearwardly into engagement with the seat generally adjacent the restraint belt anchorage;
and vehicle inertia responsive locking means for locking the carriage means to the track means at its rearwardmost position to block the occupant seat against forward movement by restraint belt loads transferred thereto.

* * * * *